United States Patent [19]

Bower

[11] Patent Number: 4,836,362
[45] Date of Patent: * Jun. 6, 1989

[54] ENDLESS DRIVE TRANSMISSION

[75] Inventor: Lewis R. B. Bower, Huddersfield, England

[73] Assignee: Fletcher Sutcliffe Wild Limited, Wakefield, Great Britain

[*] Notice: The portion of the term of this patent subsequent to Aug. 23, 2005 has been disclaimed.

[21] Appl. No.: 29,459

[22] Filed: Mar. 23, 1987

Related U.S. Application Data

[63] Continuation-in-part of Ser. No. 785,968, Oct. 20, 1985, abandoned.

[30] Foreign Application Priority Data

Oct. 17, 1984 [GB] United Kingdom ................ 8426283

[51] Int. Cl.[4] .............................................. B65G 23/36
[52] U.S. Cl. ........................................ 198/854; 198/507; 198/718; 192/58 C; 192/103 F; 192/3.33
[58] Field of Search ........ 198/330, 507, 718, 832–835, 198/810, 854–856; 74/606 R, 718, 720, 730–732; 192/3.25, 3.26, 3.27, 3.28, 4 C, 0.03, 0.032, 0.033, 58 C, 103 F, 3.33

[56] References Cited

U.S. PATENT DOCUMENTS

| | | | |
|---|---|---|---|
| 2,640,572 | 6/1953 | O'Brien | 74/731 |
| 2,719,440 | 10/1955 | Banker | 74/731 |
| 2,736,407 | 2/1956 | Smirl | 74/732 X |
| 3,163,270 | 12/1964 | Zingsheim | 74/732 X |
| 3,182,775 | 5/1965 | Schall | 192/3.26 X |
| 3,202,018 | 8/1965 | Hilpert | 74/732 |
| 3,447,397 | 6/1969 | Black et al. | 74/732 |
| 3,684,067 | 8/1972 | Anderson | 192/18 A X |
| 3,696,898 | 10/1972 | Sommer | 192/87.16 X |
| 4,132,132 | 1/1979 | Shaffer | 74/732 |
| 4,191,072 | 3/1980 | Ehrlinger et al. | 74/732 |
| 4,223,775 | 9/1980 | Lloyd | 198/855 X |
| 4,356,900 | 11/1982 | Sommer | 192/0.033 X |
| 4,377,222 | 3/1983 | Sommer | 192/0.032 X |
| 4,548,101 | 10/1985 | Akashi et al. | 74/730 X |
| 4,574,925 | 3/1986 | Nishimura et al. | 74/732 X |
| 4,574,943 | 3/1986 | Green | 198/810 |
| 4,633,985 | 1/1987 | Leorat | 192/0.032 X |
| 4,674,609 | 6/1987 | Sturges et al. | 192/103 F X |

OTHER PUBLICATIONS

The Technical Management of AFCs J. J. Bates, *The Mining Engineer*, Aug. 1984.
Universal Control Drives and Their Application in the Mining Industry; Howcroft, et al. *The Mining Engineer*, Aug., 1986.
New Technology in Conveyor Transmission Systems, L. R. Bower, *CIM Bulletin*, Sep., 1986.

*Primary Examiner*—Robert J. Spar
*Assistant Examiner*—Lyle K. Kimms
*Attorney, Agent, or Firm*—R. A. Giangiorgi

[57] ABSTRACT

The invention provides a mine conveyor, for use in hazardous atmospheres, comprising an endless conveying belt; an electric motor; and a torque transmission arrangement located between the electric motor and the endless conveying belt, the torque transmission arrangement incorporating a modulated wet clutch and a torque converter, with a drive drivable by transmission gearing and adapted to make driving relationship with the endless conveying belt; and a control system for controlling the torque transmission arrangement, the system comprising an electro-hydraulic control circuit incorporating an intrinsically safe (as herein defined) unit to monitor and control the conveyor, at least one microprocessor incorporated in the intrinsically safe unit, the microprocessor incorporating a memory whereby a ramp starting mode, a running mode, and a stop mode required for the conveyor are preprogrammable into the microprocessor, and at least one transducer included in the electro-hydraulic control circuit to monitor at least one condition of the conveyor, the transducer(s) being electrically connected to the intrinsically safe unit to relay to the unit electrical signals in accordance with the condition monitored.

23 Claims, 6 Drawing Sheets

ENDLESS DRIVE TRANSMISSION

This application is a continuation-in-part of application Ser. No. 785,968, filed Oct. 20, 1985, now abandoned.

This invention relates to a conveyor of the scraper chain type, belt type etc.

A conventional conveyor, used extensively for the handling of bulk materials such as coal, iron ore, sand etc., employs, as part of its transmission arrangement an electric motor, usually of the squirrel cage type e.g. of 150 to 200 H.P. rating, which may or may not be flameproof, driving a speed reduction gearbox via an interposed fluid coupling, with an output shaft of the gearbox intended to make driving connection with a rotary member of a conveyor. It will be appreciated that the major transmission problem occurs at the time of start-up of the conveyor where, apart from the inherent inertia of the conveyor, and the considerable friction if a scraper chain conveyor is involved, the transmission has to be capable of satisfactory start-up of an empty conveyor or a fully loaded conveyor. Apart from the disadvantageous peak current demand from the motor at start-up, use of the fluid coupling—intended to "soften", by slippage, the start-up condition or the overload condition—results in a loss of torque, while furthermore there is also the need to dissipate the heat generated at the fluid coupling particularly in the overload condition. Heat dissipation may not be straightforward and indeed may constitute a hazard if the conveyor is located in a coal mine. These and other problems associated with transmission arrangements incorporating fluid couplings are set out in detail in for instance The Mining Engineer, August 1984, pages 95-102.

According to the present invention, there is provided a mine conveyor, for use in hazardous atmospheres, comprising an endless conveying means; an electric motor; and a torque transmission arrangement located between said electric motor and said endless conveying means, said torque transmission arrangement incorporating an input shaft connectable to said electric motor, a wet clutch drivable by said input shaft, an output means of said wet clutch, a torque converter drivable by said output means, at least one torque input disc and at least one torque output disc incorporated in said wet clutch, which is engageable under hydraulic control with engagement pressure of said clutch discs being modulated to control the output torque of said clutch between zero and 100% with no clutch slip at full torque output, and with an output from said torque converter in driving relationship with torque transmission gearing, and drive means drivable by said transmission gearing and adapted to make driving relationship with said endless conveying means; and a control system for controlling said torque transmission arrangement, said system comprising an electro-hydraulic control circuit incorporating an intrinsically safe (as herein defined) unit to monitor and control said conveyor, at least one microprocessor incorporated in said intrinsically safe unit, the microprocessor incorporating a memory whereby a ramp starting mode, a running mode, and a stop mode required for said conveyor are preprogrammable into said microprocessor, at least one transducer included in said electro-hydraulic control circuit to monitor at least one condition of said conveyor, said transducer(s) being electrically connected to said intrinsically safe unit to relay to said unit electrical signals in accordance with the condition monitored; and valve means also incorporated in said electro-hydraulic control circuit said valve means being adapted to control the supply of pressure fluid to effect clutch modulation and thereby said ramp starting mode, running mode and stopping mode of said conveyor.

With the conveyor in accordance with the invention, the conventionally-provided fluid coupling is eliminated, as the invention provides, inter alia, accurate control of the area of clutch slippage (referred to as modulation) between the two extreme clutch conditions of engagement and release, for the modulation can in fact be pre-programmed into the control system to meet the particular start-up mode required. In detail, an oil of a wear deterrent kind and constituting a hydroviscous media is injected between the input and output discs, with torque transmitted between the discs during the slippage phase by lamination of the interposed oil film until slippage is eliminated when full torque output can be achieved.

In the case of a scraper chain conveyor, the latter incorporates a sprocket barrel to which driving torque needs to be applied, while in the case of a belt conveyor the latter incorporates one or more drive roller(s) to which driving torque needs to be applied. Although such driving torque could be applied directly by said drive means to said sprocket barrel or drive roller(s), it would normally be applied indirectly via an interposed speed reduction gearbox.

The electro-hydraulic control circuit may also incorporate a second valve means, which second valve means remains open in said running mode, in a fluid flow line communicating between said first mentioned valve means and said second valve means, a pre-set pressure regulator located in said fluid flow line, and for running in a low power control mode, said first mentioned valve means remaining open and the maximum pressure of said second valve means being limited by said pre-set pressure regulator to determine the maximum torque transmittable by said torque transmission arrangement in said low power mode.

Preferably, an output transmission shaft is incorporated in said gearing, and a stop facility for said endless conveying means is provided on said transmission shaft. Although the provision of the stop facility in the transmission arrangement could take the form of a two-element dog arrangement, with interengaging teeth/recesses of each element, which dog arrangement is of course operable only when the conveyor is halted, it could alternatively take the form of a multi-plate or multi-disc friction brake, which is of course operable when the conveyor is running. With a multi-plate brake this could, if required, provide, in addition to its use when the conveyor is halted as what may be considered a parking brake, a transmission braking capability. Of course, no transmission braking capability is required e.g., in the case of a scraper chain conveyor, where frictional forces can be relied on to bring the endless conveying means to a standstill. Thus, the stop facility—either as said dog arrangement or said multi-plate brake in its parking mode—may be used during the frequently required tensioning or de-tensioning operations on the chain(s) of a scraper chain conveyor or on the belt of a belt conveyor. For instance, with the stop facility inactive, and the chain(s) or belt clamped, the transmission system may be put into a low power drive mode to effect pre-tensioning, until at a predetermined torque the drive clutch slips, with the stop facility then activated to hold the pre-set tension and the electric motor powering the input shaft to the wet clutch de-activated, with an interlock means between the stop facility and the electric motor (so that the motor cannot be inadvertently switched on whilst the stop facility is active), so that the maintenance work may be effected on the chain(s) or belt, and after completion of which work the stop facility may be de-activated. Clutch slippage at a predetermined torque can be arranged by suitably controlling the fluid pressure applied to the clutch.

With the stop facility in the form of a multi-plate or multi-disc brake, this may be hydraulically, manually, spring, or dead weight actuated.

Another consideration with regard to the capabilities of the stop facility when constituted by a multi-plate or multi-disc friction brake is whether the transmission system is intended to drive a conveyor which may overrun, e.g. a belt conveyor having a downhill section, to effect braking of a so-called regenerative drive. Alternatively, if a transmission braking capability is definitely required, then clearly the system needs to incorporate a multi-plate or multi-disc brake (which could be either the same plate brake or disc brake as used for tensioning or de-tensioning referred to above, or an additional, separate brake) of capacity capable of halting the transmission system, thus serving as a so-called running or service brake. An interlock means is of course required between the brake and the electric motor to ensure that the motor is not driving whilst the brake is braking. Thus, without a running or service brake, the transmission arrangement can only be controlled by its control system in the "drive" mode, with friction being used to cause speed reduction, and whilst, as indicated above, this procedure is satisfactory for scraper chain conveyors with their high inherent friction, belt conveyor users may demand the presence of a running or service brake.

In another embodiment, the torque transmission arrangement having a stop facility in the form of a brake has the latter constituted by a second torque converter (preferably of the retarding type) and modulated clutch, adapted to drive in the opposite direction to the (first) torque converter and (first) modulated clutch, with control fluid pressure regulated between the second torque converter and second modulated clutch, and the first torque converter and first modulated clutch, to give the required braking or driving action, as required.

It is also preferred for the gearing arrangement to comprise means to reverse the direction of output of said torque transmission arrangement. Such reverse means may comprise selectively operable forward and reverse gears incorporated in said gearing.

To obtain pressure fluid for purposes such as clutch modulation and/or for de-activation/energisation of the stop facility, a shaft of the transmission system conveniently drives at least one hydraulic pump. A second pump may be provided to achieve lubrication and cooling of the clutch plates. Furthermore, the same shaft, or a different shaft, may drive a third pump for cooling water pressure generation and/or for lubrication of the driven gears of a secondary gearbox.

In one detailed embodiment of the torque transmission arrangement, this may comprise an outer casing housing both the modulated wet clutch and the gearing. The casing may comprise spaced apart end walls and intermediate first, second and third walls, said arrangement comprising an input socket rotatable about a first axis, adapted to receive a drive shaft of said electric motor, and rotatably supported by a first bearing carried in one of said end walls and a second bearing carried by said first transverse wall, the input socket, projecting beyond said first transverse wall and terminating in a drive spur pinion in mesh with a driven spur pinion, said driven spur pinion being rotatable about a parallel, spaced-apart axis and serving to input driving torque to said wet clutch, which wet clutch is located between said second and third transverse walls.

Preferably, an output drive pinion of said torque converter is located beyond said third transverse wall, a lay shaft, a driven pinion of said lay shaft in mesh with said output drive pinion, first and second drive pinions and a braking facility also being carried by said lay shaft, an output shaft, first and second drivable pinions mounted on said output shaft, and a jockey pinion, an output shaft and a drivable pinion mounted on said output shaft, said first drive pinion being in direct mesh with said first drivable pinion to rotate said output shaft in one direction, and said second drive pinion being in indirect mesh, via said jockey pinion, with said second drivable pinion to rotate said output shaft, and a dog clutch to select the direction of rotation. The output shaft is conveniently rotatably mounted in bearings carried by the second and third transverse walls. The driven spur pinion is preferably mounted on an end of said input shaft to said wet clutch, a drive pinion also being mounted on said input shaft end, and intermediate pinion in mesh with said drive pinion, a driven pinion in mesh with said intermediate pinion, and a drive shaft for at least one hydraulic pump, on which drive shaft is mounted said driven pinion.

With regard to the control system, the pre-set pressure regulator is preferably a sealed unit, and as a safety feature, it is also preferred for the absence of the pre-set pressure regulator to render the control system inoperative, with all pressure fluid returning to tank.

The control unit preferably also comprises a visual fluid pressure sensor/indicator, with output means to halt the prime mover automatically when a predetermined excess pressure is exceeded within the torque transmission arrangement and is sensed by the sensor/indicator.

The control circuit of the control system may be electrical, in which case the first and second valve means are conveniently electro-hydraulic valves. This means, in the case of the control system, that electric power is not required to enter the low power mode, but is required to leave such condition.

Preferably, the intrinsically safe unit incorporates a key pad for manual override of said preprogrammed ramp starting mode, running mode and stopping mode, whilst the intrinsically safe unit may readily be electrically connected to a central, mine control system. It is also preferred for one transducer of said electro-hydraulic control circuit to monitor the speed of said output of said torque converter and another transducer to monitor the direction of rotation of said output of said torque converter. Electrical signals (either voltage, amperage or digital) from the transducer(s) are conveniently fed into a control unit of the control arrangement, which unit regulates the output of the transmission up to a pre-set power or torque level, which torque level in turn regulates the speed. Thus, considering for example a drive transmission to a belt conveyor, after the electric motor has been started and run-up to full speed, signals are fed to the control unit which in turn regulates the speed of the output drive (a) in an automatic mode from a pre-set programme start profile, or (b) from input signals from a (belt) weigher, or (c) from bunker probes, or (d) from other measuring/monitoring sources, or (e) alternatively the control unit can be manually controlled, as desired, to a maximum, pre-set torque limit.

The control system also preferably incorporates a maximum torque pre-set adjustment and a maximum speed pre-set adjustment. The control system preferably also has a pre-selectable mid-speed or intermediate speed set point, which may be useful with a conveyor drive, required at intervals, for man-riding purposes. Furthermore, the control system may also have a minimum speed control means, if required.

The invention will now be described in greater detail, by way of example, with reference to the accompanying drawings, in which.

Figure 1:
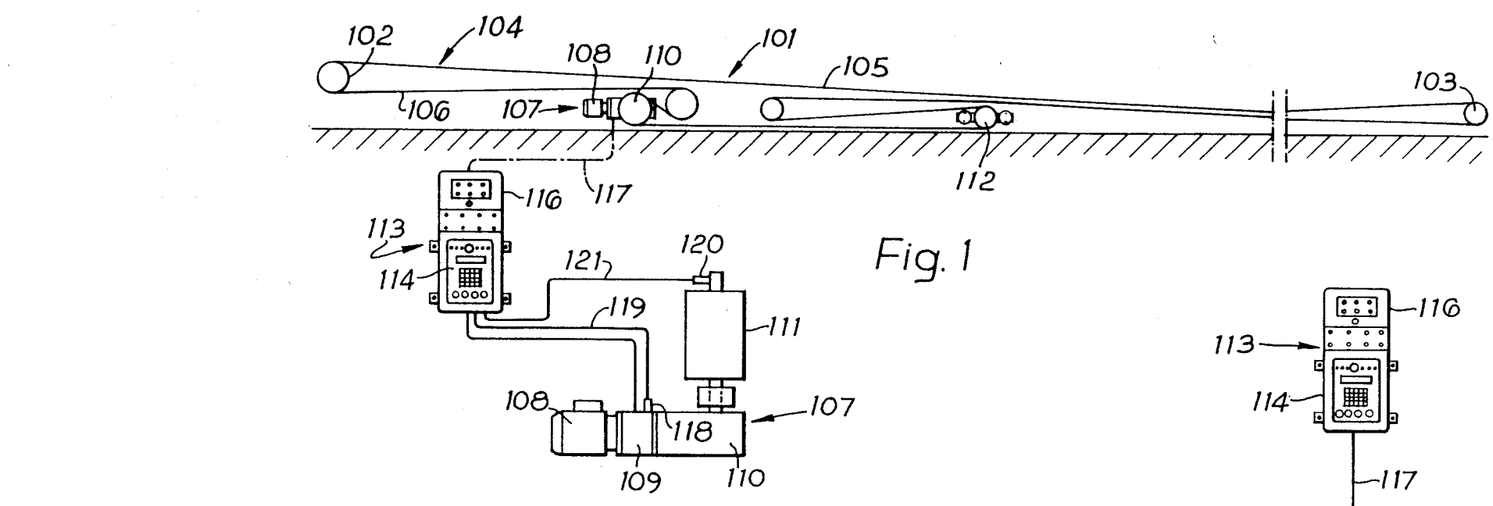
FIG. 1 is a diagrammatic side elevation of a first embodiment of conveyor in accordance with the invention.

In FIG. 1 of the drawings, is illustrated a belt conveyor 101 having one end defined by one return roller 102 and another end defined by another return roller 103, with a belt 104 having an upper conveying belt run 105 and a lower return 106. Drive is applied to return run 106 of the belt 104 by a drive unit 107.

An enlargement of the drive unit 107 is also illustrated in FIG. 1, comprising an electric motor 108 to input torque to a torque transmission arrangement 109 to input torque to a speed reduction gearbox 110 an output of which drivably engages a drive drum 111 around a portion of which is lapped the return run 106. A conventional belt tensioning device is indicated at 112.

A drive control system 113 comprises an intrinsically safe, monitor and control unit 114 electrically connected via lead 115 to a multiplexer 116 which has an outlet 117 connected to the drive unit 107, and in particular to the universal control drive 109 thereof. A direction of rotation transducer 118 is mounted on an input shaft of the torque transmission arrangement 109 and is connected by a lead 119 to the monitor and control unit 114. A speed transducer 120 is connected by a lead 121 to the monitor and control unit 114. The monitor and control unit 114 contains a microprocessor having conventional electronic storage means whereby the so-called "soft" or "ramp" start that would be required for the conveyor 101 can not only be programmed into the unit 114 but readily changed for changed operating circumstances. For instance, the unit 114 may be programmed for the drive unit 107 to attain full speed within 0-60 seconds. Because, by standard electronic techniques, another part of the monitor and control unit 114 can also be programmed for maximum torque, the drive speed will be at a lower than full speed if the torque limit is reached before the full speed is reached.

Figure 2:
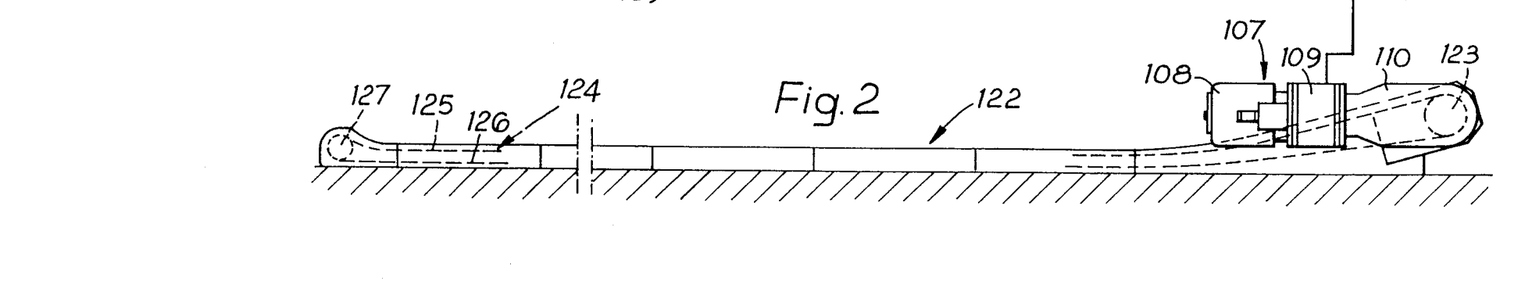
FIG. 2 corresponds to FIG. 1 but also shows a second embodiment.

In FIG. 2 of the drawings is illustrated a scraper chain conveyor 122 built up to desired length from a plurality of line pans 123 of unit length e.g., 5 ft, arranged end to end. At a head end of the conveyor 122 where mineral discharge occurs is located a drive unit 107 of the same kind as already described with reference to FIG. 1, but the output of the gearbox 110 drives a sprocket barrel 123 which engages links of an endless round link chain 124 transversely secured to which are a plurality of flight bars (not shown), so that the conveyor has a conveying run 125 and a return run 126, with a return sprocket barrel 127 located at the other, tail end of the conveyor.

Figure 3:
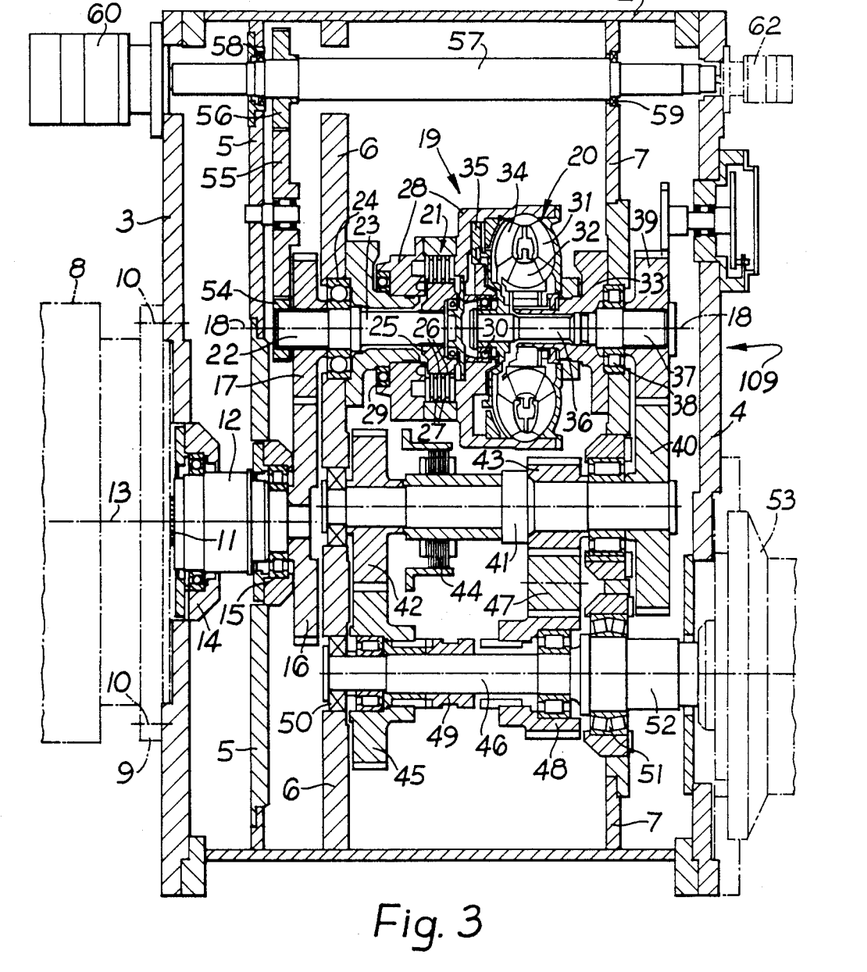
FIG. 3 is an axial sectional view through a torque transmission arrangement of the conveyors of FIGS. 1 and 2.

As illustrated in FIG. 3, the torque transmission arrangement 109 comprises an outer casing 2, with an end wall 3 at an input end of the arrangement 109, an end wall 4 at an output end of the arrangement 109, with spaced-apart first, second and third transverse walls 5, 6 and 7 respectively located in planes parallel to the end walls 3 and 4.

An electric motor 8 having a mounting flange 9 is secured by bolts on axes 10 to the end wall 3, the motor having an externally splined drive shaft 11 inserted into a correspondingly but internally splined input coupling socket 12 rotatable about a first axis 13 and rotatably supported by a first bearing 14 carried in the end wall 3 and a second bearing 15 carried by the first transverse wall 5. The input socket 12 projects beyond the first transverse wall 5 and terminates before transverse wall 6 in a drive pinion 16 in mesh with a driven spur pinion 17 rotatable about a parallel, spaced-apart axis 18 and serving to input driving torque to a universal control unit 19 located between the second and third transverse walls 6 and 7 and housing a torque converter 20 and a modulated wet clutch 21. The spur pinion 17 is carried on one end 22 of an input shaft 23 to the wet clutch 21, the shaft 23 passing through transverse wall 26 where it is rotatably supported by a bearing 24. The other end of the input shaft 23 is provided with a collar 25 carrying axially spaced-apart steel plates 26 interleaved with friction plates 27 carried by an outer casing 28 of the universal control unit 19, which casing constitutes clutch output means and is rotatably supported on ball bearings 29 and 30. The casing 28 carries an impeller 31 of the torque converter 20, while a stator 32 is carried by a static sleeve attached by a flange 33 to the third transverse wall 7, while a turbine 34, having a selectively operable lock-up clutch 35, is drivably attached to an output shaft 36 which is also rotatable about the axis 18, a portion 37 of the output shaft 36 passing through the third transverse wall 7, where the shaft is rotatably supported by a bearing 38. The output shaft 36 is in driving relationship with gearing of the torque transmission arrangement 109, and specifically, the portion 37 is provided with an output drive pinion 39 located beyond the third transverse wall 7 and in mesh with a driven pinion 40 of a lay shaft 41 carrying first and second drive pinions 42 and 43 respectively and a brake 44, the first drive pinion 42 being in direct mesh with a drivable pinion 45 of an output shaft 46, to rotate the latter in one direction, and the second drive pinion 43 being in indirect mesh, via a jockey pinion 47, with a second drivable pinion 48 of the output shaft 46 to rotate the latter in the opposite direction, with a dog clutch 49 to select the direction of rotation. The output shaft 46 is rotatably supported by bearings 50, 51 carried respectively by the second and third transverse walls 6 and 7. The output shaft 46 terminates with an internally splined coupling socket 52 to receive a correspondingly but externally splined input shaft (not shown) of a component to be driven by the torque transmission arrangement 109, such components being an input shaft to a gearbox 53 housing secondary gearing (not shown).

The end 22 of clutch input shaft 23 also carries a drive pinion 54 in mesh with an intermediate pinion 55 in mesh with a driven pinion 56 drivably mounted on a drive shaft 57 rotatably supported by bearings 58 and 59 carried, respectively, by the first and third intermediate walls 5 and 7, the drive shaft 57 passing through the end wall 2 to drive a hydraulic pump 60 mounted on the end wall 2. To the other end of the drive shaft 57 may be attached an auxiliary pump 62 for lubrication of the gearbox 53 and/or for cooling water circulation.

Figure 5:
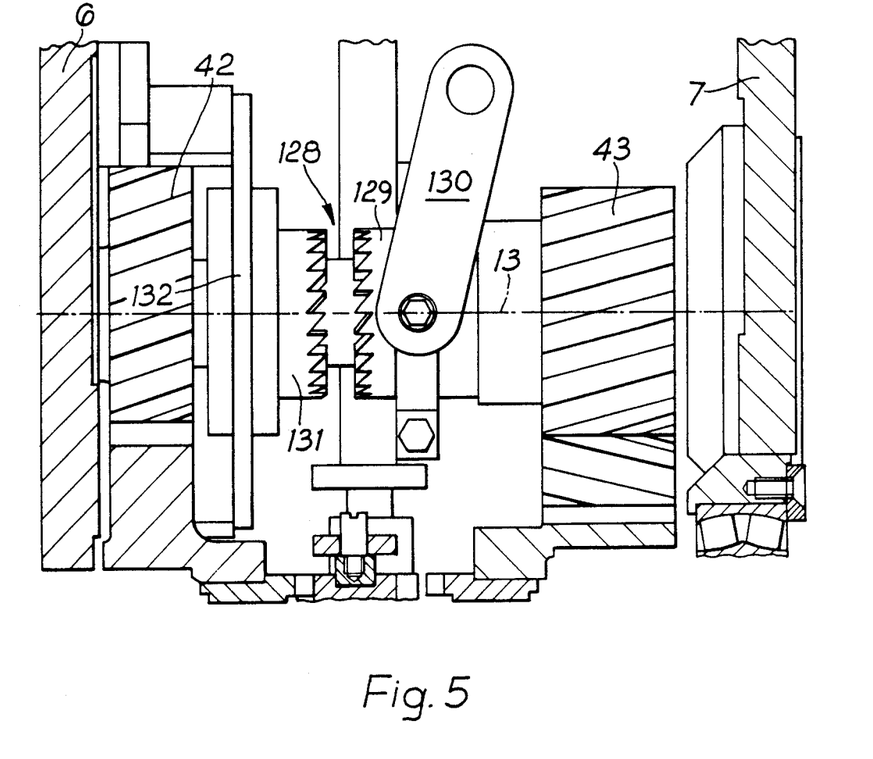
FIG. 5 illustrates an alternative stop facility to that shown in FIG. 1.

In FIG. 5 is illustrated a stop facility in the form of a dog arrangement 128 comprising a rotatable toothed element 129 advanceable and retractable along axis 13 under the control of an operating lever 130 for engagement or nonengagement with a second toothed element 131 which is nonrotatable, being fixed to the transverse wall 6 via a mounting plate 132. This dog arrangement is employed particularly on a scraper chain conveyor for chain tensioning operations, as discussed previously.

Figure 6:
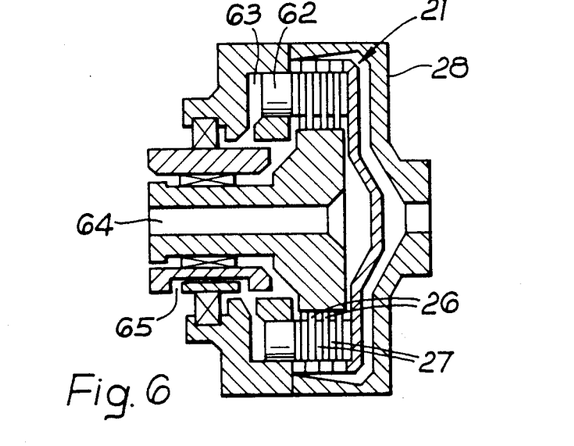
FIG. 6 is a diagrammatic sectional view through the torque converter/clutch casing of FIG. 3.

As best shown in FIG. 6, the casing 28 is also provided with a piston 62, hydraulically displaceable axially under the control of hydraulic fluid admitted to, or exhausted from, chamber 63 under the control of the control system of the second aspect of the invention, to be described in detail later and, together with the plates 26 and 27, constituting a modulated wet clutch 21.

FIG. 6 also illustrated the basic operation of the modulated clutch 21, with oil from the pump 60 fed through a pilot priority system and along passageway 64 to the clutch plates 26, 27, forcing the plates apart, to provide drive through the shearing action of the oil film. The control of the clutch pressure, which controls the rotational speed of the output pinion 39 is provided by a servo-limiter changing an electrical signal into hydraulic pressure along conduit 65 controlling the clutch pressure by the piston 62.

Figure 7:
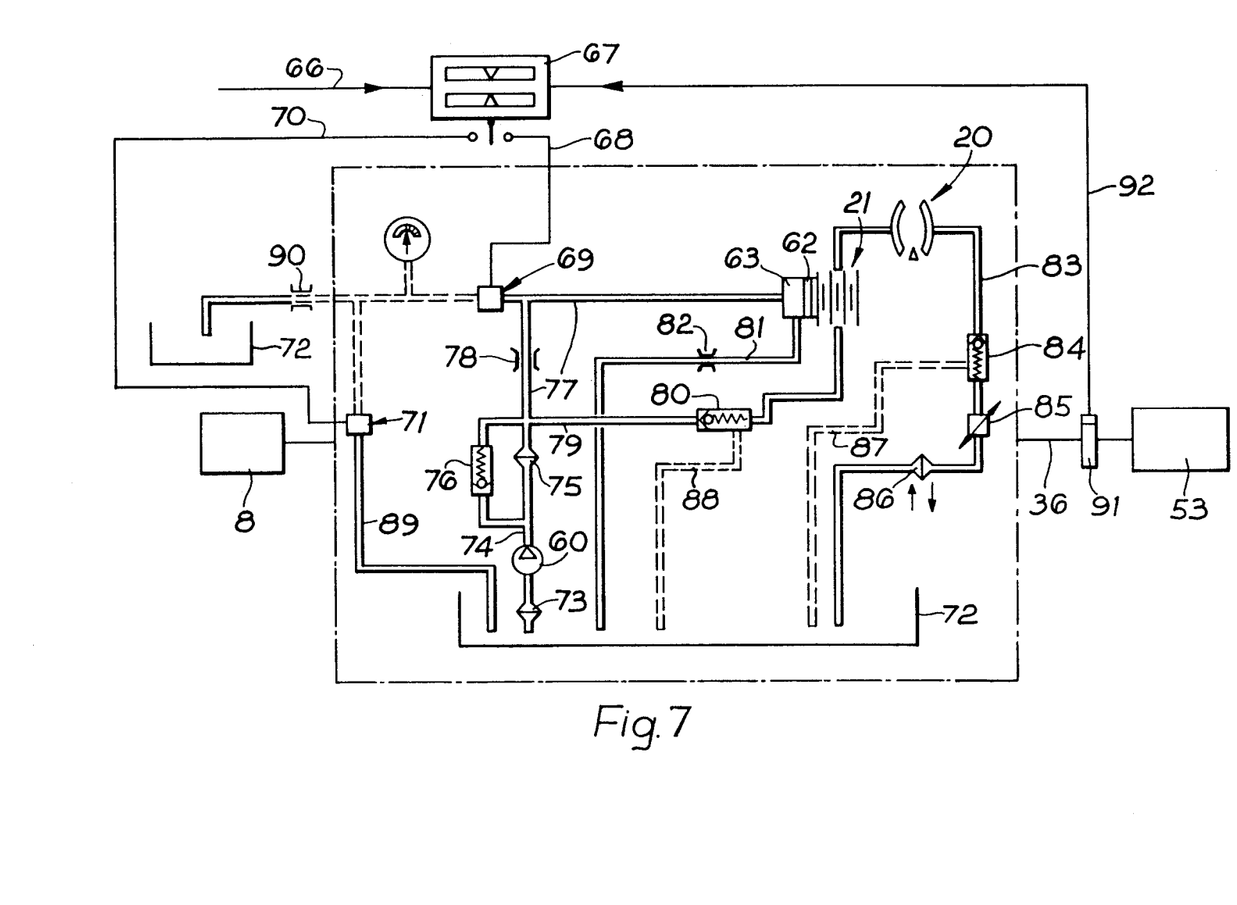
FIG. 7 is a schemmatic electro-hydraulic control circuit of the control system of the second aspect of the invention.
Figure 8:
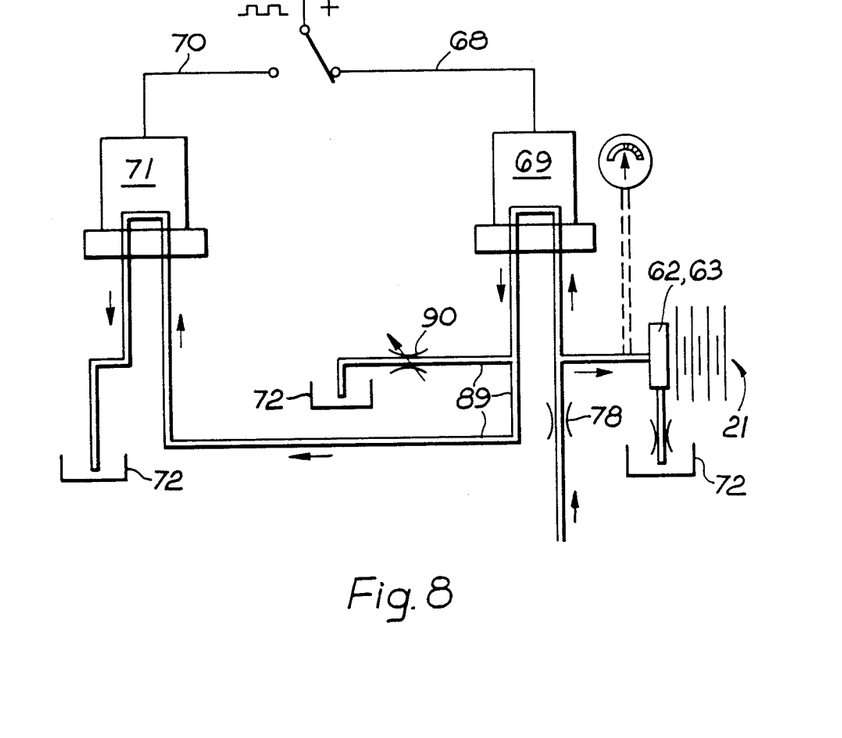
FIG. 8 details a portion of the left hand side of FIG. 7.

The electro-hydraulic circuit of FIG. 7 comprises an A.C. input 66 to an electronic control panel 67 having a first DC output 68 to operate a first electro-hydraulic valve 69 to control the torque transmission arrangement 109 in the normal running mode whereby the torque transmission arrangement 109 may transmit up to its full design output, and a second DC output 70 to operate a second electro-hydraulic valve 71, identical to the valve 69 to control the torque transmission arrangement 109 in its low power mode. Pump 60 draws oil from an oil reservoir 72 via a strainer 73, the pump 60 delivering pressurised oil to a delivery line 74 having a filter 75 and a one-way, filter/by-pass valve 76 (45 p.s.i.), the line 74 branching firstly into a clutch modulation line 77 with a flow restrictor 78 (1.8 mm), the line 77 delivering drive pressure—if so controlled by valve 69 and/or 71—to the chamber 63 of the clutch 21; and secondly into a clutch lubrication line 79 having a one way valve 80 (150–350 p.s.i.). Exhaust oil from the clutch chamber 63 passes via return line 81 to the reservoir 72, having a flow restrictor 82 (1.2 mm). Exhaust oil from the clutch plates passes via the torque converter 20 via a return line 83 having a one way valve 84, a temperature sensor 85 and an oil cooler 86, to the reservoir 72. Any oil exhausting through the valve 84 or 80 returns via lines 87, 88 to the reservoir 72.

With the valve 69 fully open, all the oil is returned via line 89 to the reservoir 72 and hence in the normal drive mode the extent of opening of the valve 69 determines the control pressure within the clutch modulation line 77. As best illustrated in FIG. 7, such return is through the second valve 71, which remains fully open when control is being effected through the first valve 69 as fluid flow line 89 communicates between the valves 69 and 71. Associated with the output shaft 36 of the torque transmission arrangement 109 is a speed sensor 91, giving an electrical signal along line 92 to the control panel 67.

For low power operation of the torque transmission arrangement 109, e.g., for chain tensioning/de-tensioning purposes of the arrangement if driving a scraper chain conveyor, control is manually switched from the panel 67 to the second valve 71 whilst the line 89 has a pre-set, sealed unit, pressure regulator 90 through which a pre-determined proportion of fluid is returned to the reservoir 72, so that the second valve 71 can only control the clutch operating pressure up to the pre-set low power regulation set by the regulator 90, due to fluid bleed-off by the latter.

Figure 4:
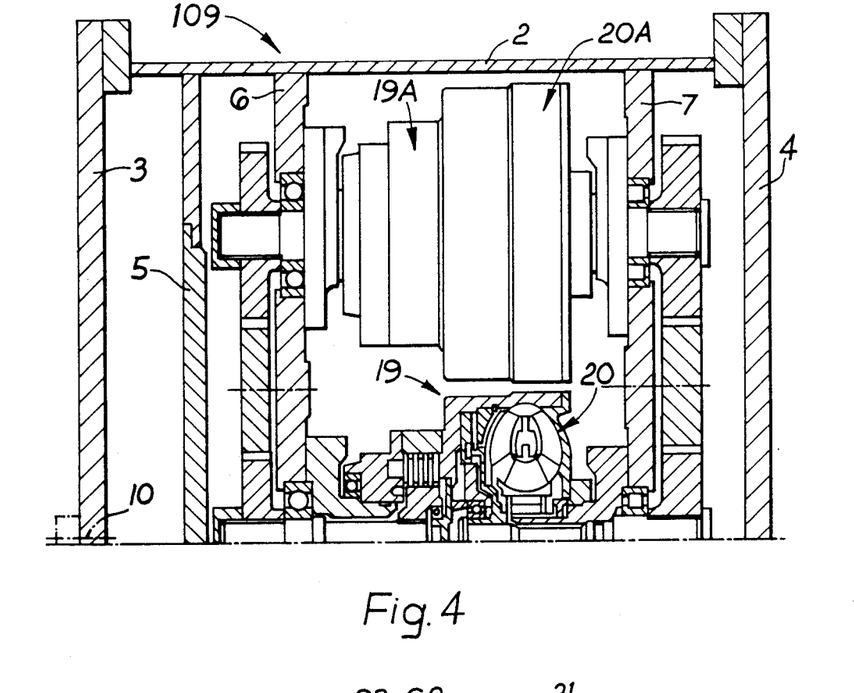
FIG. 4 corresponds to the upper portion of FIG. 3 but shows a second embodiment.

With the embodiment of FIG. 4, a second torque converter 20A and modulated clutch 19A are provided and are adapted to drive in the opposite direction to the (first) torque converter 20 and modulated clutch 21. Hence activation of the first torque converter and clutch controls the drive mode, whilst activation of the second torque converter and clutch controls the braking mode. Thus, with this embodiment it is possible to eliminate the reversing gear arrangement 43 and 46–49 of the FIG. 3 embodiment.

What I claim is:

1. A mine conveyor, for use in hazardous atmospheres, comprising an endless conveying means; an electric motor; and a torque transmission arrangement located between said electric motor and said endless conveying means, said torque transmission arrangement incorporating an input shaft connectable to said electric motor, a wet clutch drivable by said input shaft, an output means of said wet clutch, a torque converter drivable by said output means, at least one torque input disc and at least one torque output disc incorporated in said wet clutch, which is engageable under hydraulic control with engagement pressure of said clutch discs being modulated to control the output torque of said clutch between zero and 100% with no clutch slip at full torque output, and with an output from said torque converter in driving relationship with torque transmission gearing, and drive means drivable by said transmission gearing and adapted to make driving relationship with said endless conveying means; and a control system for controlling said torque transmission arrangement, said system comprising an electro-hydraulic control circuit incorporating an intrinsically safe unit to monitor and control said conveyor, at least one microprocessor incorporated in said intrinsically safe unit, the microprocessor incorporating a memory whereby control commands for said conveyor are preprogrammable into said microprocessor, at least one transducer included in said electro-hydraulic control circuit to monitor at least one condition of said conveyor, said transducer being electrically connected to said intrinsically safe unit to relay to said unit electrical signals in accordance with the condition monitored; and valve means also incorporated in said electro-hydraulic control circuit said valve means being adapted to control the supply of pressure fluid to effect clutch modulation in response to the condition monitored.

2. A mine conveyor as claimed in claim 1, wherein said electro-hydraulic control circuit also incorporating a second valve means, which second valve means remains open in said running mode, in a fluid flow line communicating between said first mentioned valve means and said second valve means, a pre-set pressure regulator located in said fluid flow line, and for running in a low power control mode, said first mentioned valve means remaining open and the maximum pressure of said second valve means being limited by said pre-set pressure regulator to determine the maximum torque transmittable by said torque transmission arrangement in said low power mode.

3. A conveyor as claimed in claim 1, wherein an output transmission shaft is incorporated in said gearing, and a stop facility for said endless conveying means is provided on said transmission shaft.

4. A conveyor as claimed in claim 3, wherein said stop facility is constituted by a brake of a multi-plate/disc kind.

5. A conveyor as claimed in claim 3, wherein said stop facility is constituted by a dog arrangement.

6. A conveyor as claimed in claim 1, comprising a second torque converter and a second modulated clutch adapted to drive in the opposite direction to said first mentioned torque converter and said first mentioned modulated clutch, with control fluid pressure regulated between said second torque converter and said second modulated clutch, and said first torque converter and said first modulated clutch, to give the required braking or driving action, as required.

7. A conveyor as claimed in claim 1, wherein said gearing comprises means to reverse the direction of output of said torque transmission arrangement.

8. A conveyor as claimed in claim 7, wherein said direction reverse means comprises selectively operable forward and reverse gears incorporated in said gearing.

9. A conveyor as claimed in claim 7, wherein a lock-up clutch is incorporated in said torque converter.

10. A conveyor as claimed in claim 1, comprising at least one hydraulic pump to generate hydraulic pressure for engagement of said clutch discs, and a pump drive shaft of said torque transmission arrangement to drive said pump.

11. A conveyor as claimed in claim 10, comprising a second hydraulic pump to generate hydraulic pressure for lubrication and cooling of the clutch plates, which second pump is also drivable by said pump drive shaft.

12. A conveyor as claimed in claim 1, wherein said torque transmission arrangement comprises an outer casing housing both said modulated wet clutch and said gearing.

13. A conveyor as claimed in claim 12, wherein said casing comprises spaced apart end walls and intermediate first, second and third walls, said arrangement comprising an input socket rotatable about a first axis, adapted to receive a drive shaft of said electric motor, and rotatably supported by a first bearing carried in one of said end walls and a second bearing carried by said first transverse wall, the input socket, projecting beyond said first transverse wall and terminating in a drive spur pinion in mesh with a driven spur pinion, said driven spur pinion being rotatable about a parallel, spaced-apart axis and serving to input driving torque to said wet clutch, which wet clutch is located between said second and third transverse walls.

14. A conveyor as claimed in claim 13, wherein an output drive pinion of said torque converter is located beyond said third transverse wall, a lay shaft, a driven pinion of said lay shaft in mesh with said output drive pinion, first and second drive pinions and a braking facility also being carried by said lay shaft, an output shaft, first and second drivable pinions mounted on said output shaft, and a jockey pinion, an output shaft and a drivable pinion mounted on said output shaft, said first drive pinion being in direct mesh with said first drivable pinion to rotate said output shaft in one direction, and said second drive pinion being in indirect mesh, via said jockey pinion, with said second drivable pinion to rotate said output shaft, and a dog clutch to select the direction of rotation.

15. A conveyor as claimed in claim 14, wherein said output shaft is rotatably mounted in bearings carried by said second and third transverse walls.

16. A conveyor as claimed in claim 13, wherein said driven spur pinion is mounted on an end of said input shaft to said wet clutch, a drive pinion also being mounted on said input shaft end, an intermediate pinion in mesh with said drive pinion, a driven pinion in mesh with said intermediate pinion, and a drive shaft for at least one hydraulic pump, on which drive shaft is mounted said driven pinion.

17. A conveyor as claimed in claim 2, wherein said pre-set pressure regulator is a sealed unit.

18. A control system as claimed in claim 1, comprising a visual fluid pressure sensor/indicator.

19. A control system as claimed in claim 2, wherein said first and second valve means are electro-hydraulic valves.

20. A conveyor as claimed in claim 1, wherein said intrinsically safe unit incorporates a key pad for manual override of said preprogrammed ramp starting mode, running mode and stopping mode.

21. A conveyor as claimed in claim 1, wherein said intrinsically safe unit is electrically connected to a central mine control system.

22. A conveyor as claimed in claim 1, wherein one said transducer of said electro-hydraulic control circuit monitors the speed of said output of said torque converter.

23. A conveyor as claimed in claim 1, wherein another of said transducers of said electro-hydraulic control circuit monitors the direction of rotation of said output of said torque converter.

* * * * *